(12) United States Patent
Hwang et al.

(10) Patent No.: US 9,667,384 B2
(45) Date of Patent: *May 30, 2017

(54) APPARATUS AND METHOD FOR TRANSMITTING AND RECEIVING FORWARD ERROR CORRECTION PACKET

(71) Applicant: Samsung Electronics Co., Ltd., Suwon-si, Gyeonggi-do (KR)

(72) Inventors: Sung-Hee Hwang, Suwon-si (KR); Hyun-Koo Yang, Seoul (KR); Seho Myung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/225,132

(22) Filed: Aug. 1, 2016

(65) Prior Publication Data

US 2016/0352465 A1    Dec. 1, 2016

Related U.S. Application Data

(63) Continuation of application No. 14/255,215, filed on Apr. 17, 2014, now Pat. No. 9,407,397.

(30) Foreign Application Priority Data

Apr. 17, 2013  (KR) .................... 10-2013-0042045

(51) Int. Cl.
  *H03M 13/00*  (2006.01)
  *H04L 1/00*  (2006.01)
(52) U.S. Cl.
  CPC .......... *H04L 1/0083* (2013.01); *H04L 1/0041* (2013.01)
(58) Field of Classification Search
  CPC ............................ H04L 1/0041; H04L 1/003
  See application file for complete search history.

(56) References Cited

U.S. PATENT DOCUMENTS

2006/0077890 A1*  4/2006  Suryavanshi ......... H03M 13/05
                                                                370/216
2009/0313293 A1  12/2009  Setlur et al.
(Continued)

FOREIGN PATENT DOCUMENTS

KR  10-2013-0101967 A   9/2013
WO       01/74012 A1  10/2001
(Continued)

OTHER PUBLICATIONS

Systems/MMT; Technologies under Consideration (TuC) for MMT; International Organisation for Standardisation; Organisation Internationale de Normalisation; ISO/IEC JTC1/SC29/WG11; Coding of Moving Pictures and Audio; XP030018830; Dec. 2011; Geneva, Switzerland.

*Primary Examiner* — Sam Rizk
(74) *Attorney, Agent, or Firm* — Jefferson IP Law, LLP

(57) ABSTRACT

A method and an apparatus for transmitting and receiving a packet in a broadcasting and communication system are provided. The method includes splitting a source packet block including source packets into a plurality of source packet subblocks, converting the source packet subblocks to source symbol subblocks, respectively, generating a plurality of first repair symbol blocks by encoding the source packet subblocks using a first error correction code, configuring an error correction source packet by adding a source error correction payload IDentifier (ID) to source symbols included in the source symbol subblocks and configuring an error correction repair packet by adding a repair error correction payload ID to repair symbols included in the first repair symbol subblocks, and transmitting the error correction source packet and the error correction repair packet.

2 Claims, 9 Drawing Sheets

(56) References Cited

U.S. PATENT DOCUMENTS

| | | |
|---|---|---|
| 2010/0023525 A1 | 1/2010 | Westerlund et al. |
| 2012/0099593 A1 | 4/2012 | Luby |
| 2013/0227376 A1 | 8/2013 | Hwang et al. |
| 2014/0307734 A1 | 10/2014 | Luby et al. |
| 2015/0319464 A1* | 11/2015 | Hellge .................. H04N 19/46 375/240.27 |

FOREIGN PATENT DOCUMENTS

| | | |
|---|---|---|
| WO | 2008/076125 A1 | 6/2008 |
| WO | 2013/129842 A1 | 9/2013 |
| WO | 2014/169233 A2 | 10/2014 |

* cited by examiner

APPARATUS AND METHOD FOR TRANSMITTING AND RECEIVING FORWARD ERROR CORRECTION PACKET

CROSS-REFERENCE TO RELATED APPLICATION(S)

This application is a continuation application of prior application Ser. No. 14/255,215, filed on Apr. 17, 2014 which claimed the benefit under 35 U.S.C. §119(a) of a Korean patent application filed on Apr. 17, 2013 in the Korean Intellectual Property Office and assigned Ser. No. 10-2013-0042045, the entire disclosure of which is hereby incorporated by reference.

TECHNICAL FIELD

The present disclosure relates to a broadcasting and/or communication system. More particularly, the present disclosure relates to an apparatus and method for transmitting and receiving a Forward Error Correction (FEC) packet in a broadcasting and/or communication system.

BACKGROUND

Due to an increase of various types of multimedia content and high-capacity content such as High Definition (HD) content or Ultra High Definition (UHD) content, data congestion in a network has become serious in the recent broadcasting and communication environment. The data congestion leads to failure of content transmission from a sender (e.g., Host A) to a receiver (e.g., Host B) and loss of part of the content.

Since data is generally transmitted in packets, data loss occurs on a packet basis. If data is lost in the network, the receiver cannot receive a data packet and thus cannot obtain data from the lost packet. Therefore, a user may experience inconvenience in various ways including degraded audio quality, degraded video quality, screen failure, loss of subtitles, file loss, and the like. Accordingly, there exists a need for a technique for recovering data lost in a network.

To support recovery of data lost in a network by a receiver, a source packet block may be constructed with a predetermined number of data packets of variable lengths, referred to as source packets, and repair information such as parity data or repair packets may be added to the source packet block by Forward Error Correction (FEC) coding. In the presence of lost data, the receiver may decode the data using the repair information.

In the process of generating parity data or repair packets from a source packet block by FEC coding, a source symbol block including source symbols of the same length is constructed from the source packet block, a repair symbol block including repair symbols is generated by FEC coding of the source symbol block, and repair symbol blocks are converted to FEC repair packets, and the FEC repair packets and FEC source packets being source packets which have been FEC-encoded are transmitted, as FEC packets. Since each of the source packets has a variable length and the source symbol block includes source symbols of the same length, padding data is required in generating the source symbol block from the source packet block. Therefore, a method for efficiently generating a source symbol block is needed. Further, there is a need for an in-band signaling method for transmitting an error correction signal (i.e., a source FEC payload IDentifier (ID)) in each source packet of an error correction packet block and transmitting an error correction signal (i.e., a repair FEC payload ID) in each repair packet.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an in-band signaling method and apparatus for transmitting and receiving a packet in a broadcasting and communication system.

In accordance with an aspect of the present disclosure, a method for transmitting and receiving a packet in a multimedia service system is provided. The method includes splitting a source packet block including source packets into a plurality of source packet subblocks, converting the source packet subblocks to source symbol subblocks, respectively, generating a plurality of first repair symbol blocks by encoding the source packet subblocks using a first error correction code, configuring an error correction source packet by adding a source error correction payload IDentifier (ID) to source symbols included in the source symbol subblocks and configuring an error correction repair packet by adding a repair error correction payload ID to repair symbols included in the first repair symbol subblocks, and transmitting the error correction source packet and the error correction repair packet. The source error correction payload ID includes a source symbol ID indicating a sequence number identifying the source symbols within the error correction source packet, and the repair error correction payload ID includes a source symbol block length indicating the number of source symbols in a source symbol block generated by concatenating the source symbol subblocks.

In accordance with another aspect of the present disclosure, an apparatus for transmitting a packet in a multimedia service system is provided. The apparatus includes an Forward Error Correction (FEC) scheme configured to split a source packet block including source packets into a plurality of source packet subblocks, to convert the source packet subblocks to source symbol subblocks, respectively, and to generate a plurality of first repair symbol blocks by encoding the source packet subblocks using a first error correction code, a protocol configured to configure an error correction source packet by adding a source error correction payload IDentifier (ID) to source symbols included in the source symbol subblocks and configure an error correction repair packet by adding a repair error correction payload ID to repair symbols included in the first repair symbol subblocks, and a transmission layer configured to transmit the error correction source packet and the error correction repair packet. The source error correction payload ID includes a source symbol ID indicating a sequence number identifying the source symbols within the error correction source packet, and the repair error correction payload ID includes a source symbol block length indicating the number of source symbols in a source symbol block generated by concatenating the source symbol subblocks.

In accordance with another aspect of the present disclosure, a method for receiving a packet in a multimedia service system is provided. The method includes receiving an error correction packet, splitting the received error correction packet into an error correction source packet and an error correction repair packet based on a packet header of the error correction packet, generating a code symbol block based on source symbols and a source error correction payload ID included in the error correction source packet and repair symbols and a repair error correction payload ID included in the error correction repair packet, and recovering source packets by decoding the code symbol block using an error correction code applied to the code symbol block. The source error correction payload ID includes a source symbol ID indicating a sequence number identifying the source symbols within the error correction source packet, and the repair error correction payload ID includes a source symbol block length indicating the number of source symbols in a source symbol block generated by concatenating the source symbol subblocks.

In accordance with another aspect of the present disclosure, an apparatus for receiving a packet in a multimedia service system is provided. The apparatus includes a receiver configured to receive an error correction packet, and a decoder configured to split the received error correction packet into an error correction source packet and an error correction repair packet based on a packet header of the error correction packet, to generate a code symbol block based on source symbols and a source error correction payload IDentifier (ID) included in the error correction source packet and repair symbols and a repair error correction payload ID included in the error correction repair packet, and to recover source packets by decoding the code symbol block using an error correction code applied to the code symbol block. The source error correction payload ID includes a source symbol ID indicating a sequence number identifying source symbols within the error correction source packet, and the repair error correction payload ID includes a source symbol block length indicating the number of source symbols in a source symbol block generated by concatenating the source symbol subblocks.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
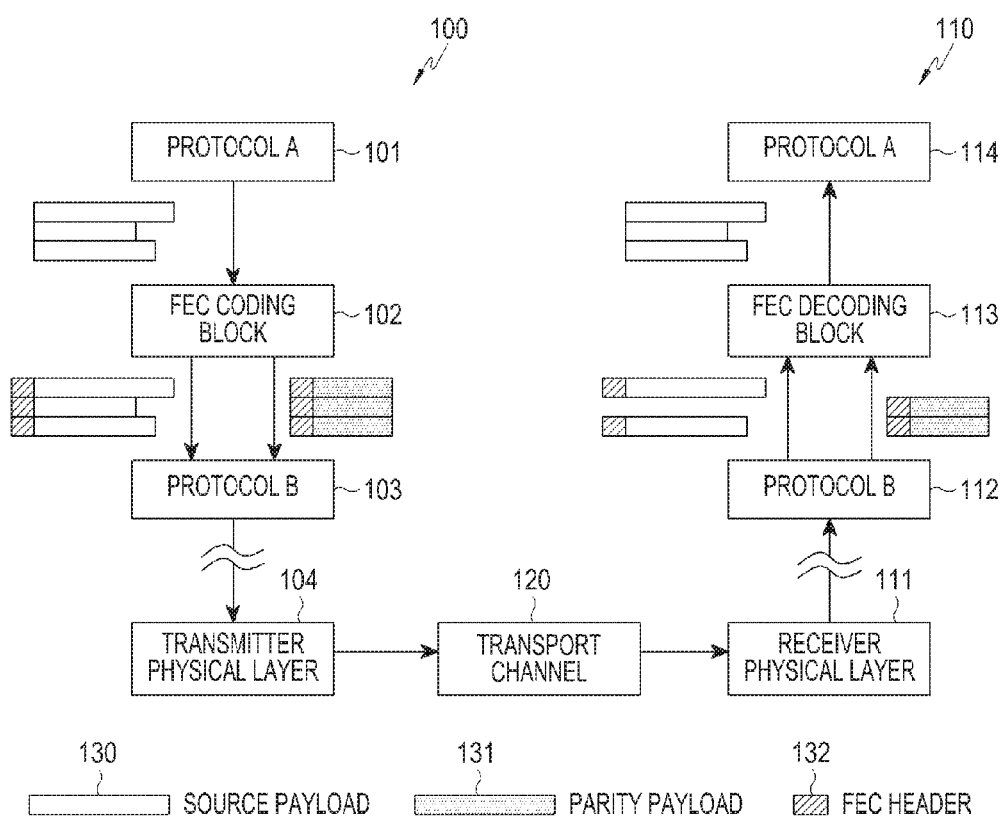
FIG. 1 is a block diagram of a transmitter and a receiver according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure are applicable to any electronic device that transmits and receives various multimedia services including a video conference and/or a video call as well as high-capacity content such as High Definition (HD) content or Ultra High Definition (UHD) content. The electronic device may be any of a portable phone, a TeleVision (TV), a computer, an electronic blackboard, a tablet, an e-book reader, and the like. Particularly, the present disclosure provides a method for, when Forward Error Correction (FEC) is applied to data packets, splitting a source packet block into source packet subblocks, and efficiently constructing a source symbol block and source symbol subblocks, to thereby improve decoding performance or increase transmission efficiency. While a specific FEC coding method is not mentioned in the specification, the present disclosure is not limited to a specific FEC coding method. In the present disclosure, one or more of a Reed-Solomon (RS) code, a Low Density Parity Check (LDPC) code, a Turbo code, a Raptor code, a Raptor Q code, XOR (a single parity-check code), a Pro-Moving Picture Experts Group (MPEG) FEC code, and the like may be selectively used.

Before describing the present disclosure, terms used herein are defined as follows.

Forward Error Correction (FEC) code: an error correction code used to correct an error symbol or an erasure symbol.

Source symbol: a unit of data used during an encoding process.

Parity (repair) symbol: an encoding symbol that is not a source symbol.

Source packet: a packet protected by FEC.

Source packet block: a set of source packets of an FEC source flow, which are to be protected as a single block.

Source symbol block: a set of source symbols generated from a single source packet block.

Parity (repair) symbol block: a set of repair symbols which can be used to recover lost source symbols.

Encoding symbol block: a set of encoding symbols generated by encoding a source symbol block.

Encoding symbol: a unit of data generated by the encoding process where source symbols are a part of the encoding symbols.

FEC repair packet: a packet having a repair FEC payload IDentifier (ID) to deliver one or more repair symbols of a repair symbol block.

FEC source packet: a source packet having a source FEC payload ID.

FEC source packet block: a set of FEC source packets to deliver a source symbol block.

FEC repair packet block: a set of repair packets to deliver a repair symbol block.

FEC payload ID: an identifier that identifies the contents of a Moving Picture Experts Group (MPEG) Media Transport (MMT) packet with respect to an MMT FEC scheme.

Repair FEC payload ID: an FEC payload ID specifically for use with repair packets.

Source FEC payload ID: an FEC payload ID specifically for use with source packets.

MMT: an international standard under design to efficiently deliver MPEG data.

FEC source flow: a flow of source packets protected by a single instance of an MMT FEC scheme.

FEC scheme: a specification that defines additional protocol aspects required to use FEC codes.

FEC code: an algorithm for encoding data such that the encoded data flow is resilient to data loss.

FEC repair flow: a data flow carrying repair symbols to protect a source flow.

FEC encoded flow: a logical set of flows that includes an FEC source flow and its associated one or more FEC repair flows.

Asset: a data entity containing data with the same transport characteristics and composed of one or more Media Processing Units (MPUs) with the same asset ID.

MPU: a generic container for independently decodable timed or non-timed data, which is media codec agnostic.

Package: a logical collection of data, which includes one or more assets and their related asset delivery characteristics and a Composition Information (CI).

MMT packet: a formatted unit of data generated or consumed according to an MMT protocol.

MMT payload: a formatted unit of data to carry a package or signaling message using either an MMT protocol or Internet application layer transport protocols (e.g., Real-time Transmission Protocol (RTP)).

MMT protocol: an application layer transport protocol for delivering MMT payload over an Internet Protocol (IP) network.

FIG. 1 is a block diagram of a transmitter and a receiver according to an embodiment of the present disclosure.

Referring to FIG. 1, a transmitter 100 includes a protocol A block 101 corresponding to an FEC higher-layer protocol, an FEC coding block 102, a protocol B block 103 corresponding to an FEC lower-layer protocol, and a transmitter physical layer block 104.

The protocol A block 101 constructs transmission data into a source packet including source payload 130. The FEC coding block 102 constructs a source packet block with source packets received from the protocol A block 101, generates parity (repair symbols) including parity payload 131 by FEC-encoding the source packet block, adds an FEC header 132 to each of the source packets and the parity symbols, and provides the source packets and parity symbols having the FEC headers 132 to the protocol B block 103. A source packet added with an FEC header is referred to as an FEC source packet and a parity symbol added with an FEC header is referred to as an FEC parity packet. While an FEC source packet is shown in FIG. 1 as a data unit in which an FEC header and payload are sequentially concatenated, the FEC source packet may be configured by concatenating the source payload with the following FEC header. In addition, while the FEC coding block 102 is interposed between the protocol A block 101 and the protocol B block 103 in FIG. 1, the FEC coding block 102 may be incorporated into the protocol A block 101. In this case, an FEC parity packet may include a protocol header to execute a function of the protocol A block 101 and the protocol A block 101 having the FEC coding block 102 may include a multiplexer for multiplexing a source packet and a parity packet into one packet flow.

The transmitter physical layer block 104 converts the FEC source packets and the FEC parity (recovery) packets to a signal suitable for transmission through a transport channel 120. Many layers may exist between the protocol B block 103 and the transmitter physical layer block 104 and their detailed configurations are beyond the scope of the present disclosure and thus will not be described herein.

A receiver 110 includes a receiver physical layer block 111, a protocol B block 112 corresponding to an FEC lower-layer protocol, an FEC decoding block 113, and a protocol A block 114 corresponding to an FEC higher-layer protocol.

The receiver physical layer block 111 interprets a signal received through the transport channel 120 and provides the interpreted signal to the protocol B block 112. As in the transmitter 100, many layers may exist between the protocol B block 112 and the receiver physical layer block 111 and their detailed configurations are beyond the scope of the present disclosure and thus will not be described herein. The protocol B block 112 interprets the received signal or packets and provides the received FEC packets to the FEC decoding block 113. A part of FEC packets transmitted by the transmitter 100 may be lost due to network congestion and errors generated in a physical layer and thus may not be provided to the FEC decoding block 113. The FEC decoding block 113 recovers lost source packets by FEC decoding of the received FEC packets and provides the recovered source packets along with the received packets to the protocol A block 114. The afore-mentioned FEC header refers to an FEC payload ID. The FEC header of an FEC source packet refers to a source FEC payload ID and the FEC header of an FEC repair packet refers to a repair FEC payload ID. If the present disclosure is implemented in an MMT system, a source packet is an MMT packet, an FEC source packet is an MMT packet with a source FEC payload ID, and an FEC repair packet is an MMT packet with a repair FEC payload ID, carrying a parity (repair) symbol.

Figure 2:
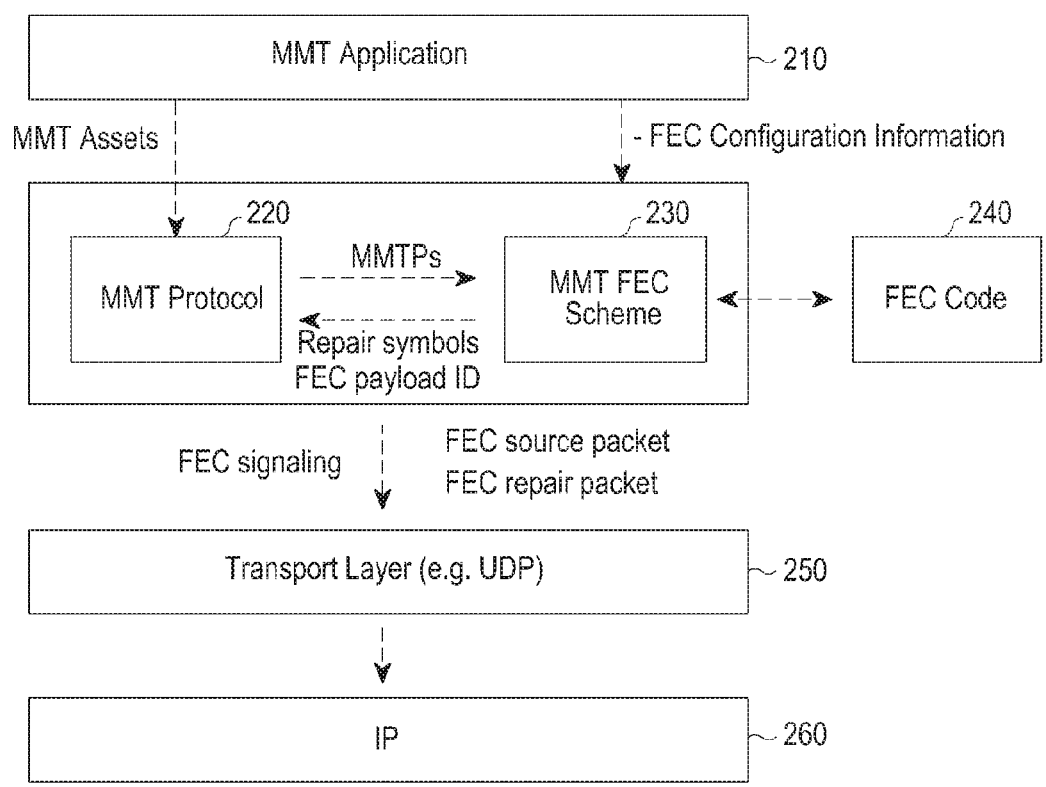
FIG. 2 illustrates an Application Forward Error Correction (AL-FEC) architecture in a Moving Picture Experts Group (MPEG) Media Transport (MMT) system according to an embodiment of the present disclosure.

FIG. 2 illustrates an Application FEC (AL-FEC) architecture in a MMT system according to an embodiment of the present disclosure.

Referring to FIG. 2, an MMT application 210 determines MMT assets to be transmitted with AL-FEC protection and provides the MMT asset to an MMT protocol 220. Further, the MMT application 210 provides FEC configuration information to an MMT FEC scheme 230. The MMT protocol 220 packetizes the received MMT assets into MMT Payloads (MMTPs), generates source packets by adding MMT packet headers to the MMTPs, and provides the source packets in source packet blocks each including a predetermined number of source packets to the MMT FEC scheme 230. The MMT FEC scheme 230 generates a source symbol block from each of the received source packet blocks according to a given source symbol block generation method based on the FEC configuration information received from the MMT application 210. The source symbol block generation method is given as the FEC configuration information in an embodiment of the present disclosure. If the FEC configuration information describes the source symbol block generation method, the MMT FEC scheme 230 generates the source symbol blocks according to the embodiment of the present disclosure. An FEC code 240 receives a source symbol block from the MMT FEC scheme 230, generates a parity (repair) symbol block from the received source symbol block, and provides the parity (repair) symbol block to the MMT scheme 230. The MMT FEC scheme 230 generates FEC payload IDs for the source symbol block and the parity (repair) symbol block and provides the parity (repair) symbols received from the FEC code 240 to the MMT protocol 220. The MMT protocol 220 generates an FEC source packet by adding a source FEC payload ID to a source packet, generates an FEC repair packet by adding a repair FEC payload ID, an MMT payload header, and an MMT packet header to a parity (repair) symbol, and transmits the FEC source packet and the FEC repair packet to an IP 260 through a transport layer 250 such as User Datagram Protocol (UDP). While it has been described above for the convenience of description that FEC source packets and FEC parity (repair) packets are generated and transmitted on a source packet block basis, it is preferred that at the moment the MMT FEC scheme 230 receives a source packet from the MMT protocol 220, the MMT FEC scheme 230 generates an FEC source packet by adding a source FEC payload ID to the received source packet and immediately transmits the FEC source packet, while the MMT FEC scheme 230 stores source packets in an internal memory, generates, upon receipt of the last source packet of the source packet block, a source symbol block from a source packet block so that the FEC code 240 generates a parity symbol block, and then generates and transmits FEC parity (repair) packets by providing the generated parity symbol block along with FEC payload IDs to the MMT protocol 220.

Figure 3:
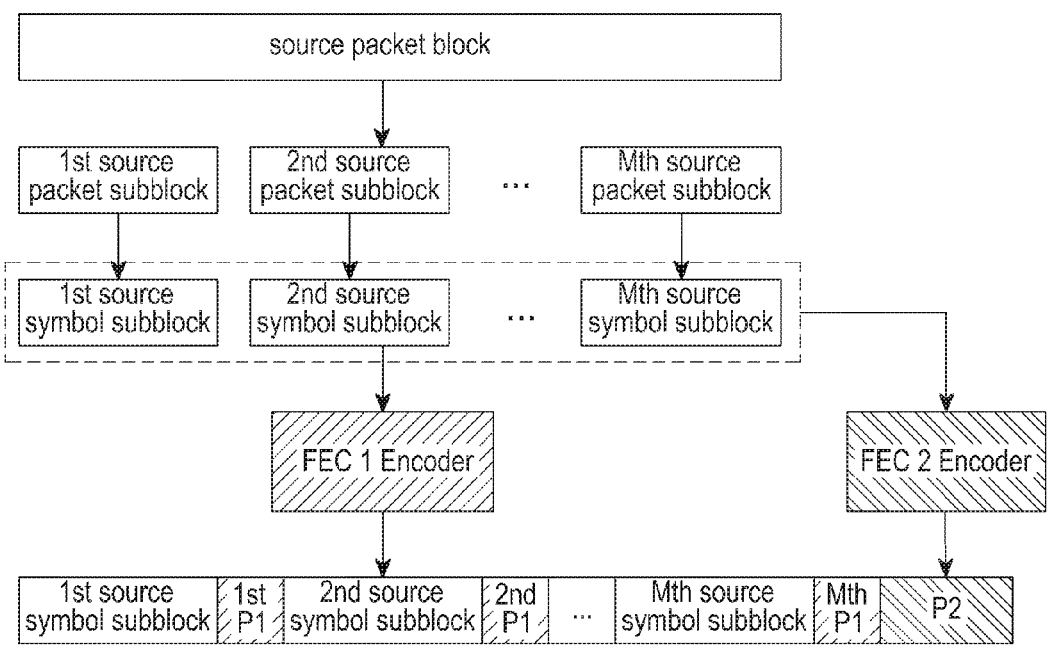
FIG. 3 illustrates a two-stage Forward Error Correction (FEC) coding method according to an embodiment of the present disclosure.

FIG. 3 illustrates a two-stage FEC coding method according to an embodiment of the present disclosure.

The MMT standard has adopted the two-stage coding scheme to protect packets requiring relatively high reliability using one or more error correction codes. Referring to FIG. 3, in the two-stage coding scheme, an MMT protocol and an MMT FEC scheme (collectively referred to as an MMT FECFRAME) splits a source packet block including a predetermined number of source packets into first M (M is an integer larger than 1) source packet subblocks, generates first M source symbol subblocks from the first M source packet subblocks, and generates first encoding symbol blocks including the first source symbol subblocks and first parity (repair) symbol blocks generated by a first FEC coding of the first source symbol subblocks. Subsequently, the MMT FECFRAME generates a second encoding symbol block including a second parity (repair) symbol block generated by a second FEC coding of the first M source symbol subblocks as a second source symbol block. A first FEC and a second FEC used respectively in the first FEC coding and the second FEC coding may be the same or different. Known codes and codes that will be known in the future such as RS codes, LDPC codes, Turbo codes, Raptor codes, XOR codes, and the like are available as the first FEC and the second FEC. The first FEC and the second FEC are not limited to any specific codes. In FIG. 3, $i^{th}$ P1 (i=1, 2, . . . , M) denotes a repair symbol block for an $i^{th}$ source symbol subblock and P2 denotes a repair symbol block for a source symbol block.

To efficiently protect layered media data, LA-FEC may be used. An example of the layered media data may be content encoded by Scalable Video Coding (SVC) or Multi-view Video Coding (MVC).

Figure 4:
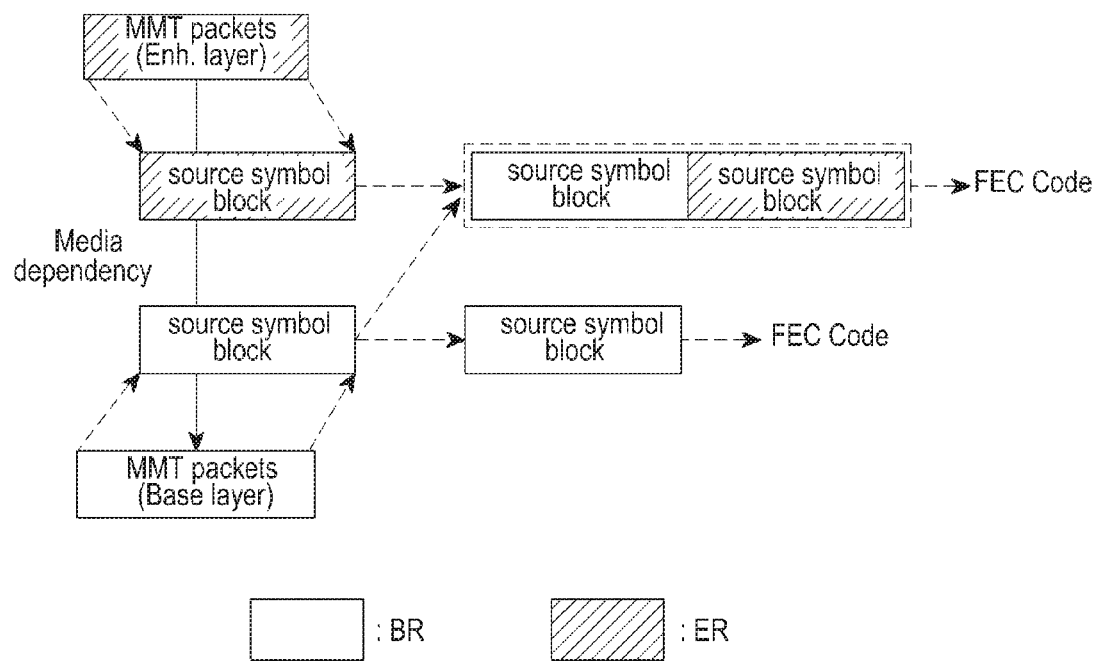
FIG. 4 illustrates a method for generating a source symbol block for layered media data with two layers for Layer-Aware FEC (LA-FEC) according to an embodiment of the present disclosure.

FIG. 4 illustrates a method for generating a source symbol block for layered media data with two layers for LA-FEC according to an embodiment of the present disclosure.

Referring to FIG. 4, Base Representation (BR) of a base layer is data that can be decoded independently in a media CODEC, whereas Enhancement Representation (ER) of an enhancement layer is data dependent on the BR. It is to be noted that BR is also used in the generation a parity for ER1 in FIG. 4.

Figure 5:
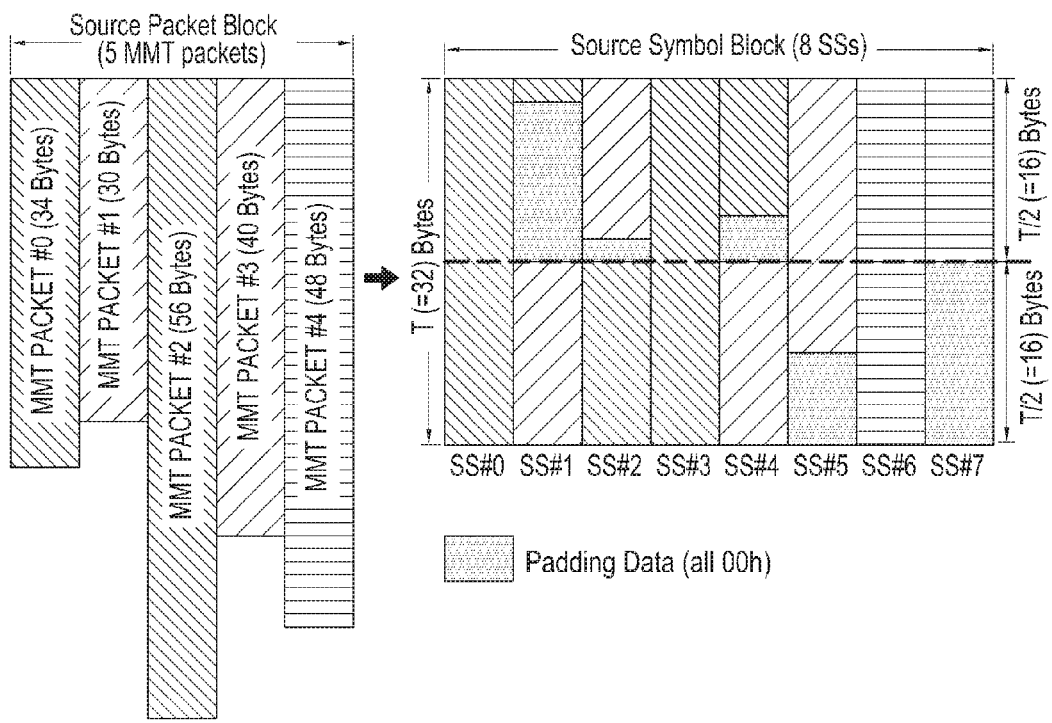
FIG. 5 illustrates a method for generating a source symbol block from a source packet block according to an embodiment of the present disclosure.

FIG. 5 illustrates a method for generating a source symbol block from a source packet block according to an embodiment of the present disclosure.

Referring to FIG. 5, a source symbol block generator (not shown) generates a T×K source symbol block from a source packet block according to a source symbol size T, the number of symbol elements per the source symbol size T, m, and the number of source symbols, K. The source symbol block generator acquires T and m from FEC configuration information. In the illustrated case of FIG. 5, T is 32 bytes and m is 2. The source symbol block generator receives five source packets of variable sizes, MMT packet #0 to MMT packet #4. The source packets are filled in the source symbol block, sequentially starting from the first column of the source symbol block on a symbol element basis. When needed, the remaining part of a symbol element is filled with padding data having a predetermined value such as 00h. That is, a source packet is always filled from the start of a symbol element. If the symbol element is not filled up with the source packet, the remaining part of the symbol element is filled with 00h. Then the next source packet is filled, starting from the state of the next symbol element. Referring to FIG. 5, when a second symbol element of a symbol SS#7, that is, the last symbol element of the source symbol block is not filled up with a source packet due to lack of data of the source packet, padding data is filled in the empty part of the symbol element.

If a plurality of source symbol block generation methods are used, an indicator indicating a source symbol block generation method corresponding to a specific source symbol block, such as ssbg_mode should be transmitted to a receiver.

In the two-stage coding scheme, a source symbol block is constructed as follows. It is assumed that a source packet block includes M source packet subblocks. A T×K1 first source symbol subblock is generated using source packets of a first source packet subblock according to a given m value in the method illustrated in FIG. 5 and transmits the first source symbol subblock to an FEC encoder (not shown). The FEC encoder generates a parity symbol block from the source symbol subblock. The same operation is performed sequentially on second to $M^{th}$ source symbol subblocks. After parity symbol blocks are generated for all source symbol subblocks, a source symbol block is constructed by combining all symbol subblocks. The FEC encoder generates a parity symbol block using the source symbol block.

In the LA-FEC scheme, a source symbol is constructed as follows. It is assumed that media data has M layers and an $i^{th}$ layer depends on a first to $(i-1)^{th}$ layers. A source packet block includes M source packet subblocks and an $i^{th}$ source packet subblock corresponds to data of an $i^{th}$ layer. A first source symbol subblock is generated using source packets of a first source packet subblock from among the source packet subblocks and transmitted to the FEC encoder. The FEC encoder generates a parity symbol block from the source symbol subblock and provides the parity symbol block to an FEC block generator. Then a source symbol block is constructed by combining the first source symbol with a second source symbol subblock and provided to the FEC encoder. The FEC encoder generates a parity symbol block from the source symbol subblock and provides the parity symbol block to an FEC block generator. The same operation is repeated sequentially. Finally, a source symbol block is constructed by combining the first to $M^{th}$ source symbols and provided to the FEC encoder. The FEC encoder generates a parity symbol block from the source symbol subblock and provides the parity symbol block to the FEC block generator. After the operation, all parity symbol blocks generated from the M source symbol subblocks and the parity symbol block generated from the source symbol block are provided to an FEC packet generator.

Figure 6:
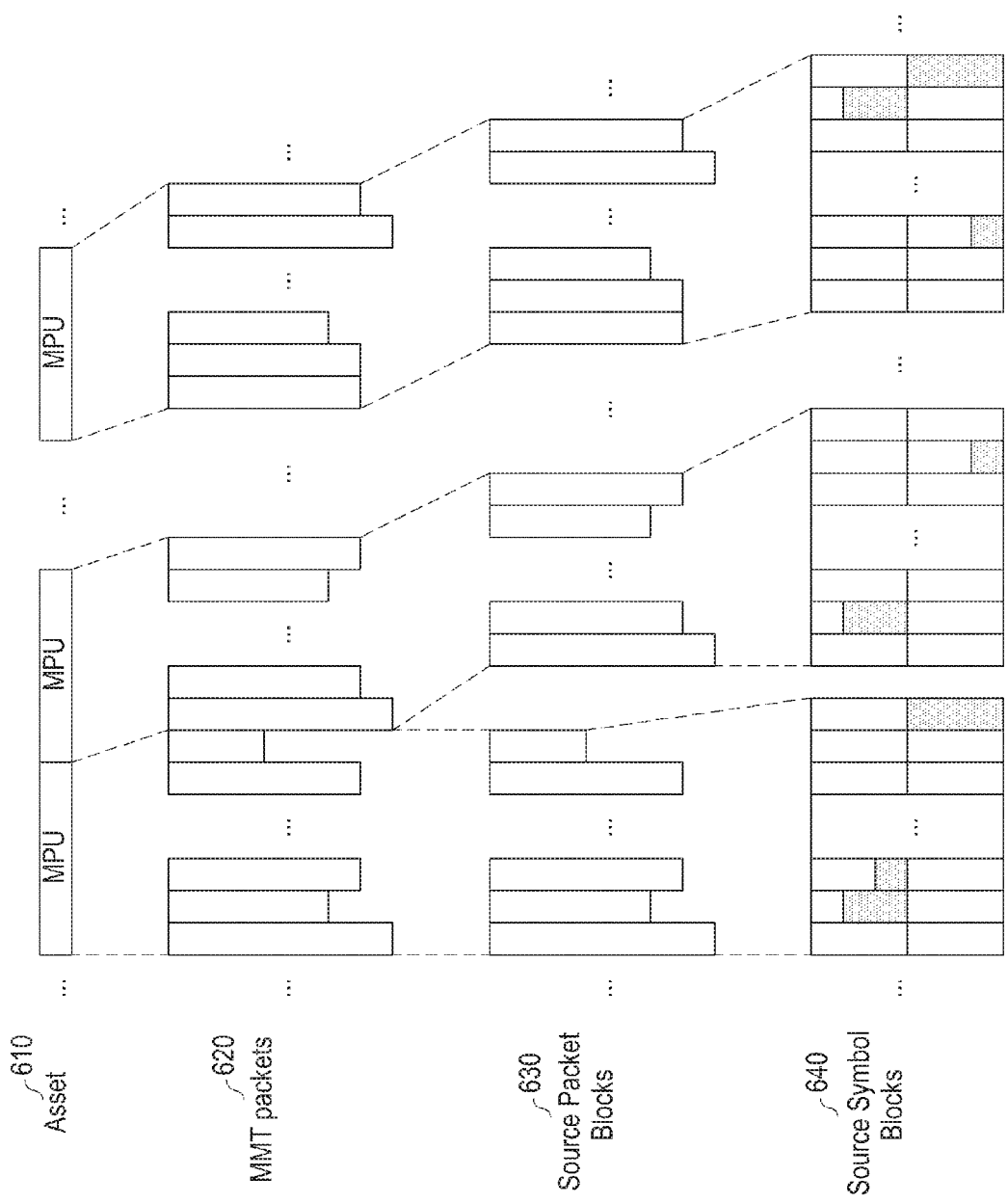
FIG. 6 illustrates a method for constructing source packet blocks from a source packet flow and generating source symbol blocks from the source packet blocks according to an embodiment of the present disclosure.

FIG. 6 illustrates a method for constructing source packet blocks from an MMT packet stream and generating source symbol blocks from the source packet blocks according to an embodiment of the present disclosure.

Referring to FIG. 6, an asset 610 includes MPUs and each MPU is packetized into MMT packets 620.

The MMT packets are divided into source packet blocks 630 each including a predetermined number of MMT packets and each source packet block 630 is converted into a source symbol block 640. In the illustrated case of FIG. 6, m=2. When a source packet block is converted into a source symbol block, each source packet of the source packet block is filled in the source symbol block on a symbol element. If a symbol element is not filled up with a source packet, the remaining part of the symbol element is filled with padding data having a predetermined value such as 00h. Then the next source packet is filled in the next symbol element, starting from the start of the next symbol element. If the last source symbol of the source symbol block is not filled up with the last source packet, the remaining part of the last source symbol is filled with padding data having a predetermined value such as 00h. If the size of the padding data is larger than T/M, a padding symbol element is created. In the present disclosure, padding data occupying a symbol element is referred to as a padding symbol element.

Figure 7:
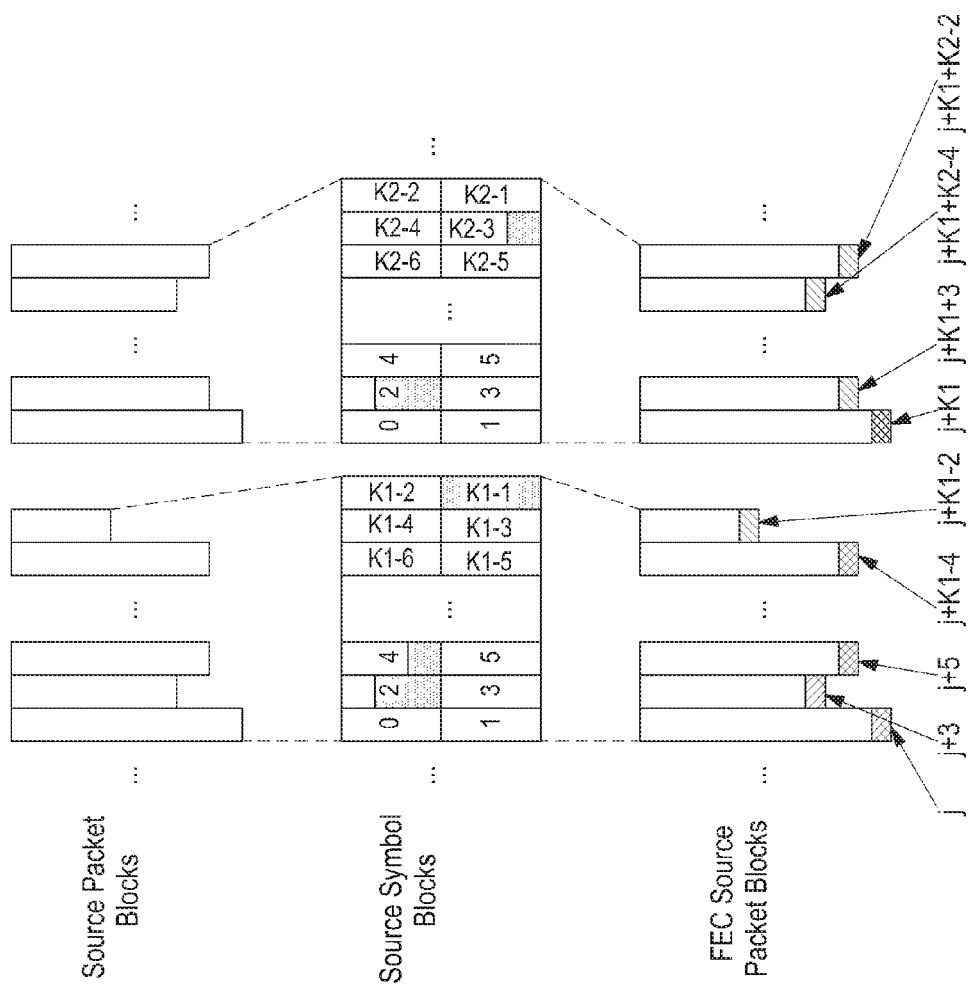
FIG. 7 illustrates a method for assigning source FEC payload IDentifiers (IDs) to FEC source packet blocks according to an embodiment of the present disclosure.

FIG. 7 illustrates a method for assigning source FEC payload IDs (SS_IDs) to FEC source packet blocks according to an embodiment of the present disclosure.

Referring to FIG. 7, for m=2, source symbol blocks are generated from source packet blocks in the source symbol block generation method illustrated in FIG. 6 according to the embodiment of the present disclosure. The source symbol blocks have K1 symbol elements and K2 symbol elements, respectively, and the last symbol element, symbol element (K1-1) of a first source symbol block, is a padding symbol element. The symbol elements of the source symbol blocks are numbered from 0 to (K1-1) and from 0 to (K2-1), respectively. When SS_ID is set as the source FEC payload ID of an FEC source packet, a random value j is set as SS_ID. Then SS_ID is incremented by the number of source elements included in the FEC source packet, for the next FEC source packet. Although SS_ID of the last FEC source packet of the first FEC source packet block is set to j+K1-2 and includes one symbol element, the last symbol element of the first source symbol block is a padding symbol element and thus SS_ID of the first FEC source packet of the second FEC source packet block is set to j+K1, not j+K1-1, taking into account the padding symbol element.

Figure 8:
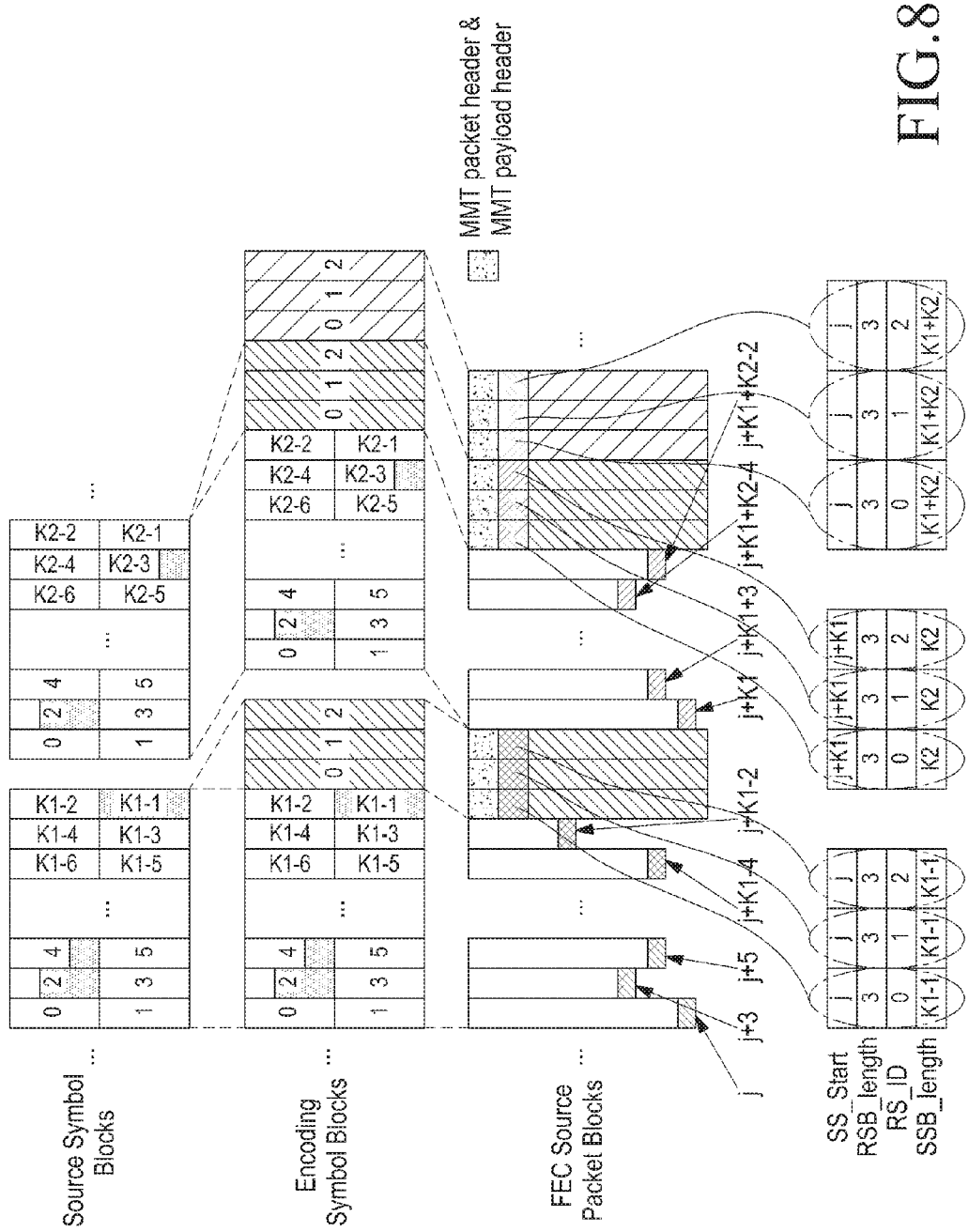
FIG. 8 illustrates a method for assigning repair FEC payload IDs to FEC repair packet blocks according to an embodiment of the present disclosure.

FIG. 8 illustrates a method for setting a repair FEC payload ID according to an embodiment of the present disclosure.

Referring to FIG. 8, two source symbol blocks are generated in the same manner as illustrated in FIGS. 6 and 7. Two parity symbol blocks each including three parity symbols are generated from the two source symbol blocks by a first FEC code, FEC 1 code and a parity symbol block including three parity symbols is generated from a source symbol block having the two source symbols blocks by a second FEC code, FEC 2 code. As illustrated in FIGS. 6 and 7, SS_ID is assigned as a source FEC payload ID to each source packet of each source packet block in the manner illustrated in FIG. 7 and the source packet with SS_ID is transmitted as an FEC source packet. Each parity symbol of the parity symbol blocks generated by FEC coding is added with a repair FEC payload ID, an MMT payload header, and an MMT packet header and transmitted as an FEC parity packet. The repair FEC payload ID includes SS_Start, RSB_length, RS_ID, and SSB_length fields and each field is described in Table 2 further below. The values of the fields in each FEC parity (repair) packet are set as illustrated in FIG. 8. The repair FEC payload IDs of three FEC parity packets of a parity symbol block for a first source symbol block are given as follows.

SS_Start is set to SS_ID, j of a first FEC source packet of a first FEC source packet block. SS_Start is set to j in all FEC parity packets for the first FEC source packet block, indicating the starting packet of the FEC source packet block. RSB_length is set to 3 in all FEC parity packets to indicate that the parity symbol block includes three parity symbols. SSB_length is set to K1-1 to indicate that the number of symbol elements except for a padding symbol element in the source symbol block is K1-1. RS_ID is set to 0, 1, and 2, respectively in the FEC parity symbols, to identify the FEC parity symbols.

The repair FEC payload IDs of three FEC parity packets of a parity symbol block for the second source symbol block are set in the same manner. SS_Start is set to j+K1, RSB_length is set to 3, SSB_length is set to K2, and RS_ID is set to 0, 1, and 2 for the FEC parity packets.

The repair FEC payload IDs of three FEC parity packets of the parity symbol block for the source symbol block being a combination of the first and second source symbol blocks are set in the same manner. For all FEC parity packets, SS_Start is set to SS_ID, j of the first FEC source packet of a combined FEC source packet block, indicating the starting packet of the FEC source packet block. RSB_length is set to 3 in all FEC parity packets, indicating that the parity symbol bloc includes three parity symbols. SSB_length is set to K1+K2, indicating that the number of symbol elements in the combined source symbol block except for a padding symbol element in the last source symbol of the combined source symbol block is K1+K2. RS_ID is set to 0, 1, and 2 for the respective FEC parity packets, to identify the respective parity symbols.

In this manner, a receiver may determine the boundary of an FEC source packet block and the size of a corresponding source symbol block from a received FEC parity packet. Since the receiver determines a starting FEC source packet from SS_Start and the number of source symbols in the source symbol block from SSB_length, the receiver may determine from SS_ID of the received FEC source packet whether the received packet is included in a corresponding FEC source packet block. That is, in the case where SS_Start is j and SSB_length is K1−1, if SS_ID of a received FEC source packet is j, it is a starting FEC source packet. If SS_ID of a received FEC source packet is smaller than j+K1, it is included in a corresponding FEC source packet block. Since it may be determined that a source symbol block includes [(K1−1)/m] T-size source symbols from SSB_length based on T and m values received in advance by out-band signaling, a symbol element of the source symbol block in which the received FEC source packets start may be determined by subtracting SS_Start from SS_ID of FEC source packets of a corresponding FEC source packet block. Thus, the source symbol block may be reconstructed. Herein, [A] where A denotes an arbitrary real number denotes a maximum integer equal to or smaller than A. If K1−1 set as SSB_length is not a multiple of m, it may be determined that S (=K1−1 (mod m)) padding symbols elements are padded. Here, S is the remainder of dividing (K1−1) by m.

Meanwhile, in FIG. 2, the FEC code 240 calculates parity symbols from an input source symbol block by an FEC coding algorithm and outputs a parity symbol block including the parity symbols. In a special implementation, the FEC coding algorithm calculates a predetermined number of parity symbols for the input of a predetermined number of source symbols. In this case, the FEC code 240 does not require additional control information. In another implementation, the FEC coding algorithm may require FEC coding information about the number of source symbols, the number of parity symbols, and the relationship between source symbols and parity symbols. While an FEC block generator (not shown) of the MMT FEC scheme 230 may transmit the FEC coding information as a part of FEC transmission information to the FEC code 240, it is obvious that all other components of the MMT FECFRAME may recognize the FEC transmission information and use it in a coding operation from the perspective of the overall system as described before.

Figure 9A:
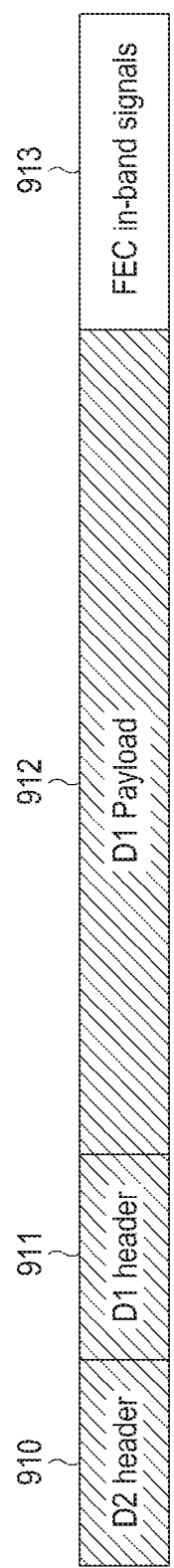
FIGS. 9A and 9B illustrate formats of FEC packets according to an embodiment of the present disclosure.
Figure 9B:
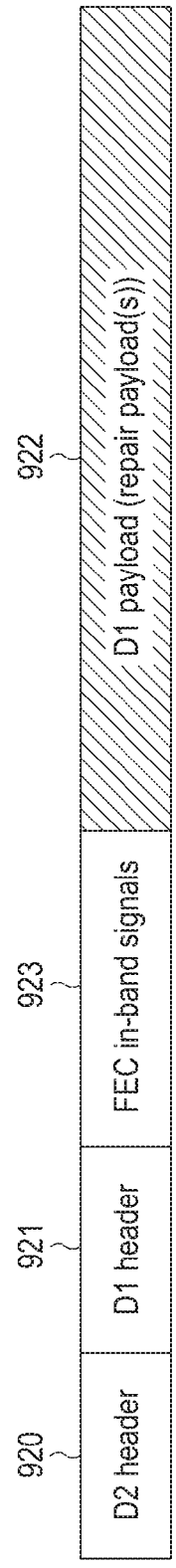

FIGS. 9A and 9B illustrate formats of FEC packets according to an embodiment of the present disclosure.

FIG. 9A illustrates an FEC source packet. Referring to FIG. 9A, a D2 header 910 is an MMT packet header, a D1 header 911 is an MMT payload header, a D1 Payload 912 carries payload data, and FEC in-band signals 913 represent a source FEC payload ID.

FIG. 9B illustrates an FEC parity (repair) packet. Referring to FIG. 9B, a D2 header 920 is an MMT packet header, a D1 header 921 is an MMT payload header, FEC in-band signals 923 represent a repair FEC payload ID, and a D2 payload 922 carries one or more parity symbols.

As described above, after FEC coding, a source FEC payload ID is assigned to an MMT packet as illustrated in FIG. 9A. Parity (repair) symbols are generated from a source packet block including MMT packets having the format of FIG. 9A by a series of operations according to an embodiment of the present disclosure. A parity (repair) symbol is added with a repair FEC payload ID, an MMT payload header, and an MMT packet header as illustrated in FIG. 9B. In FIG. 9A, the FEC in-band signals 913 are set at the last of an FEC source packet so that the uniformity of a protocol packet (MMT packet) may be maintained and source packets may be continuous in FEC packets. An FEC parity packet delivers one or more parity symbols. The parity symbols are used to reconstruct a source symbol block including source packets. In FIG. 9B, the FEC in-band signals 923 are disposed between the transmission protocol headers and the parity symbol to facilitate acquisition of FEC-related information at a receiver.

Referring back to FIG. 2, the FEC packet generator (not shown) of the MMT protocol 220 generates an FEC packet including a source packet or a parity symbol, a source FEC payload ID or a repair FEC payload ID, and in-band signals and outputs the FEC packet in an FEC packet block. The source or parity FEC payload ID may be regarded as an in-band signal in FIG. 2.

In the MMT system, a source packet is an MMT packet. The MMT packet includes an MMT packet header and MMT payload. The MMT payload includes an MMT payload header and payload data. The MMT FEC scheme 230 of FIG. 2 constructs an FEC parity packet by adding an MMT payload header and an MMT packet header to payload data as which an input parity (repair) symbol together with a repair FEC payload ID is regarded and transmits the FEC parity packet.

In an embodiment of the present disclosure, the source FEC payload ID and the repair FEC payload ID are defined as follows.

TABLE 1

SS_ID
SS_Start

TABLE 2

SS_Start
RSB_length
RS_ID
SSB_length

The fields illustrated in Table 1 and Table 2 have the following meanings.

SS_ID (Source Symbol ID): the sequence number identifying source symbols within an FEC source packet. SS_ID is incremented per symbol element by one. The same things applied to a padding symbol element. It is set to SS_ID of the first symbol element in the FEC source packet. The difference between SS_IDs of a current packet and the next packet is equal to the number of symbol elements included in the current packet. Exceptionally, if a source symbol block of a current FEC source packet block includes a padding symbol element, the difference between SS_IDs of the last FEC source packet of the current FEC source packet block and the first FEC source packet of the next FEC source packet block is the sum of the number of padding symbol elements and the number of symbol elements included in the last FEC source packet of the current FEC source packet block. The sequence number starts from an arbitrary value and wraps around 0 after the highest of integers represented in predetermined 4 or more bytes.

SS_Start: this field is optional in an FEC source packet. If an FEC source packet includes SS_Start, SS_Start is set to the SS_ID of the first source symbol of its associated source symbol block. This corresponds to information about the boundary of a source symbol block to which the source packet belongs. In an FEC parity packet, this information is set to the SS_ID of the first FEC source packet of its associated FEC parity packet block. The receiver may determine the boundary of an FEC source packet, particularly the start position of the FEC source packet from a received FEC packet, based on this information.

RSB_length: the number of parity symbols in a parity symbol block to which parity symbol(s) of an FEC parity packet belongs. That is, if P parity (repair) symbols are generated from a source symbol block including K source symbols by an FEC code, this field is set to P.

RS_ID: a sequence number identifying a parity symbol in an FEC parity packet. It starts with 0 and is incremented by 1 in each parity symbol block. If one FEC parity packet includes a plurality of parity symbols, RS_ID represents the smallest of the sequence numbers of the plurality of parity symbols.

SSB_length: indicates the number of symbol elements included in a source symbol block (subblock) protected by a parity symbol(s) in an FEC parity packet. It does not include padding symbol elements in the last source symbol of the source symbol block if any. That is, if the number of source symbols in a source symbol block is K and the number of padding symbol elements in the last source symbol of the source symbol block is p, this field is set to (Kxm-p).

In an embodiment of the present disclosure, a receiver performs FEC decoding as follows. The receiver determines an FEC flow ID per source flow transmitted as an out-band signal, FEC detection or non-detection according to the FEC flow ID, an FEC type, an FEC coding structure, a source symbol size T (i.e., a parity symbol size), the number of symbol elements in a source symbol, m, and a source symbol block generation method (ssbg_mode) and prepares for FEC decoding based on the values. The receiver classifies FEC packets having the same FEC flow ID from among received FEC packets. The receiver determines whether an FEC packet is an FEC source packet or an FEC parity packet based on FEC type information of the classified FEC packets. In the case of two-stage FEC coding, the receiver additionally determines whether an FEC parity packet is P1 or P2. If the FEC packet is an FEC source packet, the receiver checks SS_ID from the source FEC payload ID of the FEC source packet. If the FEC packet is an FEC parity packet, the receiver checks SS_Start, RSB_length, RS_ID, and SSB_length from the parity FEC payload ID of the FEC parity packet. The receiver generates an encoding symbol block by payloads of the FEC packets (source symbols or parity symbols) at an appropriate position of a source symbol block or a parity symbol block according to the recognized FEC payload ID, the source symbol size T, the number m of symbol elements in a source symbol, and ssbg_mode. The receiver recovers source symbols corresponding to a source packet lost during transmission by decoding using an FEC code applied to the generated encoding symbol block. If the recovered source symbols have padding data, the receiver finally recovers source packets by removing the padding data.

Each source symbol includes at least one symbol element and the number of symbol elements is equal for every source symbol, and the SS_ID is incremented per symbol element by 1. The source symbol may include a padding byte and the source symbol block may include padding symbol elements having only padding bytes as a last symbol element, and SS_ID the padding symbol element is set to SS_ID of a first symbol element of the source FEC packet. The SSB_length indicates the number of symbol elements in the source symbol block, except for the padding symbol element. The SSB_length indicates the number of symbol elements in the source symbol block. The parity FEC payload ID further includes SS_Start indicating a boundary of the source symbol block, and the SS_Start is set to SS_ID of a first symbol element of an associated source symbol block.

The receiver receives FEC configuration information. The FEC configuration information includes ssbg_mode. The ssbg_mode indicates a source symbol block configuration scheme and the number of symbol elements per source symbol according to the ssbg_mode, before receiving the FEC packet. The parity FEC payload ID further includes a SS_Start, a RSB_length and a RS_ID. The SS_Start indicates a boundary of the source symbol block, the RBS_length indicates the number of repair symbols generated in an associated parity FEC symbol block, and the RS_ID identifies a first repair symbol in the parity FEC packet. The source FEC payload ID is placed at the end of the source FEC packet, and the parity FEC payload ID is placed in front of the parity FEC packet.

In an embodiment of the present disclosure, a transmitter may transmit FEC-applied content selectively by transmitting FEC configuration information or other coding configuration information to a receiver. In an embodiment of the present disclosure, FEC may be applied selectively according to a network situation or Quality of Service (QoS) of content. In an embodiment of the present disclosure, all or a part of FEC control information including FEC configuration information or other coding configuration information is transmitted periodically or all or a part of the FEC configuration information is transmitted in an in-band signal method of the present disclosure. Therefore, even a new receiver may acquire the FEC configuration information during a service in progress and thus recover lost data by FEC decoding. Accordingly, a better service can be provided to users.

The proposed apparatus and method for transmitting and receiving an FEC packet may be implemented as computer-readable code in a non-transitory computer-readable recording medium. The non-transitory computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and the like. In addition, the non-transitory computer-readable recording medium may be distributed over the computer systems connected over the network, and computer-readable codes may be stored and executed in a distributed manner.

As is apparent from the foregoing description, an apparatus and method for efficiently transmitting and receiving a packet in a broadcasting/communication system can be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method comprising:
    dividing a source packet block including source packets into a plurality of source packet subblocks;
    converting the plurality of source packet subblocks into a plurality of source symbol subblocks;
    generating a plurality of first repair symbol blocks by encoding each of the plurality of source symbol subblocks by a first error correction code, each of the plurality of first repair symbol blocks comprising at least one first repair packet;
    generating a second repair symbol block by encoding the plurality of source symbol subblocks by a second error correction code, the second repair symbol block comprising at least one second repair packet; and
    transmitting the plurality of first repair symbol blocks and the second repair symbol block,
    wherein the at least one first repair packet comprises a first repair payload identification including information indicating a number of source symbols in a corresponding source symbol subblock,
    wherein the at least one second repair packet comprises a second repair payload identification including information indicating a number of source symbols in the source packet block.

2. The method of claim 1, wherein the plurality of source packet subblocks are converted to the plurality of source symbol subblocks according to a generation mode providing information on a size of the source packets.

* * * * *